United States Patent [19]
Javidi

[11] Patent Number: 5,903,648
[45] Date of Patent: May 11, 1999

[54] METHOD AND APPARATUS FOR ENCRYPTION

[75] Inventor: Bahram Javidi, Storrs, Conn.

[73] Assignee: The University of Connecticut, Storrs, Conn.

[21] Appl. No.: 08/595,873

[22] Filed: Feb. 6, 1996

[51] Int. Cl.⁶ .............................. H04L 9/00; G03H 1/16
[52] U.S. Cl. ............................ 380/10; 380/54; 382/276; 382/280; 359/6; 359/29; 365/125
[58] Field of Search .............................. 380/28, 6, 7, 54, 380/10; 382/275, 276, 280; 359/6, 29; 365/125

[56] References Cited

U.S. PATENT DOCUMENTS

| | | | |
|---|---|---|---|
| 4,393,276 | 7/1983 | Steele | 179/1.5 R |
| 4,558,462 | 12/1985 | Horiba et al. | 382/42 |
| 5,072,314 | 12/1991 | Chang | 359/559 |
| 5,315,668 | 5/1994 | O'Hair | 382/14 |
| 5,485,312 | 1/1996 | Horner et al. | 359/561 |

OTHER PUBLICATIONS

Bahram Javidi, Jospeh L. Horner, "Optical pattern recognition for validation and security verification", Jun. 1997/vol. 33 No. 6; pp. 1752–1756.

Philippe Refregier, Bahram Javidi, "Optical image encryption based on input plane and Fourier plane random encoding", Apr. 1, 1995/vol. 20, No. 7; pp. 767–769.

*Primary Examiner*—Gilberto Barrón, Jr.
*Assistant Examiner*—Carmen D. White
*Attorney, Agent, or Firm*—Cantor Colburn LLP

[57] ABSTRACT

A method and apparatus of encrypting optical images and storing these images in memory using random phase encoding is presented. The encryption technique uses random phase encoding in both the input plane and the Fourier plane. Each image is encrypted and can be read out by a unique code or a universal code. The image to be encrypted is first multiplied by a random phase function. The Fourier transform of the product of the image and the random phase function is then multiplied by another random phase function in the Fourier domain. Taking the inverse Fourier transform, an encrypted image in the output plane is obtained. Each encrypted image can be stored in optical memory. The encryption process of the present invention can be done optically or electronically with one or two dimensional functions for encryption. Further, the image can be phase encoded (optically or digitally) prior to the encryption process, with a phase reading technique employed to obtain the original decrypted image. Also, a joint transform correlator may be used for the encryption and/or decryption of the present invention. It will be appreciated that a variety of well known methods can be used to store or display the encrypted images.

62 Claims, 7 Drawing Sheets

METHOD AND APPARATUS FOR ENCRYPTION

BACKGROUND OF THE INVENTION

The present invention relates to encryption. More specifically, the present invention relates to a novel method and apparatus of encryption using random encoding.

Image data security has recently become an important issue. An image is generally a two-dimensional data. In accordance with which, a picture of an image can be considered as a two-dimensional memory, which may comprise one or more images, and may need encryption in many applications for security reasons. Furthermore, optical encryption methods using random phase encoding have been proposed recently, see generally "Optical pattern recognition for validation and security verification," by B. Javidi and J. L. Horner, Opt. Eng. 33, 1752–1756 (1994).

SUMMARY OF THE INVENTION

The above-discussed and other drawbacks and deficiencies of the prior art are overcome or alleviated by the method and apparatus of encrypting optical images and storing these images in memory using random phase encoding of the present invention. In accordance with the present invention, an encryption technique using random phase encoding in both the input plane and the Fourier plane (or a transform plane) is presented. Each image is encrypted and can be read out by a unique code or a universal code. The image to be encrypted is first multiplied by a random phase function. The Fourier transform of the product of the image and the random phase function is then multiplied by another random phase function in the Fourier domain. Taking the inverse Fourier transform, an encrypted image in the output plane is obtained. Each encrypted image can be stored in optical memory. The encrypted image and the memory are stationary white noise if the two encrypting random phase functions are two independent white sequences uniformly distributed. This makes it very difficult to decrypt the image and the memory without the knowledge of the phase functions used in the encryption.

The encryption process of the present invention can be done optically or electronically with one or two dimensional functions for encryption. Further, the image can be phase encoded (optically or digitally) prior to the encryption process, with a phase reading technique employed to obtain the original decrypted image. Also, a joint transfor correlator may be used for the encrytion and/or decryption of the present invention. It will be appreciated that a variety of well known methods can be used to store or display the encrypted images.

Using different keys to decrypt different memory data allows the memory to be distributed through public channels. Only the keys are needed to be distributed securely. This allows many users share the same encrypted memory without losing the security.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 6A–D show computer simulated decryption results with phase codes of different sizes wherein FIG. 6A is an original image of "E", FIG. 6B is a decrypted image of "E" with the decrypting phase code of 200×200 pixels; FIG. 6C is a decrypted image of "E" with the decrypting phase code of 100×100 pixels, and FIG. 6D is a decrypted image of "E" with the decrypting phase code of 50×50 pixels;

DESCRIPTION OF THE PREFERRED EMBODIMENT

Figure 1:
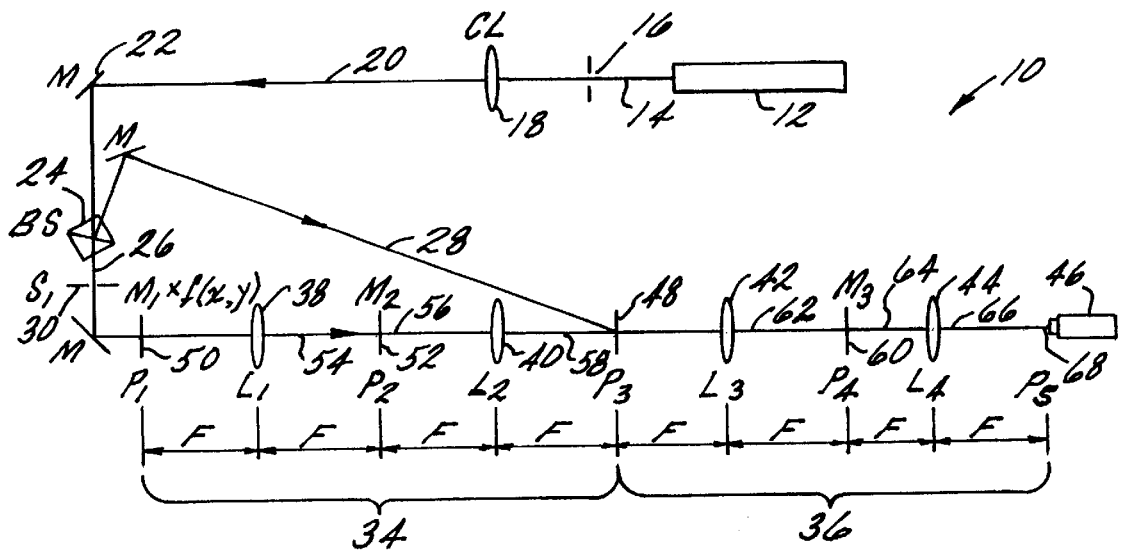
FIG. 1 is a schematic diagram of an optical assembly for use in the encryption/decryption technique of the present invention.

Generally, an encryption technique using random phase encoding in both the input plane and the Fourier plane is presented. More specifically, each stored image is encrypted and can be read out by a unique code or a universal code. In accordance with this exemplary method, the image to be encrypted is first multiplied by a random phase function. The Fourier transform of the product of the image and the random phase function is then multiplied by another random phase function in the Fourier domain. Taking the inverse Fourier transform, an encrypted image in the output plane is obtained which is then stored in the optical memory (e.g., see "Optical memory disks in optical information processing," by D. Psaltis, Appl. Opt. 29, 2038–2057 (1990) and "Programmable image associative memory using an optical disk and a photo refractive crystal," by M. A. Neifeld, D. Psaltis, Appl. Opt. 32, 4398–4409 (1993), both of which are incorporated herein by reference in their entirety), which can be a hologram, a computer generated hologram or other well known techniques (e.g., see Introduction to Fourier Optics, by J. W. Goodman, McGraw-Hlill, New York (1967) and Fundamentals of Photonics, by B. E. A. Salchand and M. Teich, Wiley (1990), which are incorporated herein by reference in their entirety). The encrypted memory is a stationary white noise if the two encrypting random phase functions are two independent white sequences uniformly distributed on [0, 2π], e.g., see "Optical image encryption based on input plane and Fourier plane random encoding," by Ph. Refregier and B. Javidi, Opt. Lett., 20(7), (1995), which is incorporated herein by reference in its entirety. This makes it very difficult to decrypt the memory without the knowledge of the phase functions used in the encryption, see "Optical image encryption based on input plane and Fourier plane random encoding," by Ph. Refregier and B. Javidi, Opt. Left., 20(7), (1995) and Probability, Random Variable, and Stochastic Processes, by A. Papoulis, 2nd edition, McGraw-Hill, New York (1984) which is incorporated herein by reference in its entirety.

By way of example, $f_i(x,y)$ denotes the ith optical image to be stored in the memory of a computer $n_i(x,y)$ and $b_i(\alpha, \beta)$ denote two independent white sequences uniformly distributed on [0, 2π], respectively. Herein x and y are the coordinates of the space domain, and α and β are the coordinates of the Fourier domain. In the encryption process, the random phase function $\exp[jn_i(x,y)]$ is used in the space domain and the random phase function $\exp[jb_i(\alpha, \beta)]$ is used in the Fourier domain. The encrypted memory can be represented as:

$$\varphi(x, y) = \sum_{i=1}^{M} \{f_i(x, y)\exp(jn_i(x, y))\} * \mu_i(x, y)$$

where M is the total number of data images stored in the memory, $\mu_i(x,y)$ is the inverse Fourier transform of $\exp[jb_i(\alpha, \beta)]$, and * denotes the convolution operation. In accordance with the present invention, the ith data image can only be decrypted when a corresponding key, i.e., $\exp[-jb_i(\alpha, \beta)]$, is used for the decryption. If $\exp[jb(\alpha, \beta)]$ is used to encrypt all the images, then $\exp[-jb(\alpha, \beta)]$ can serve as a universal key to decrypt all the encrypted images.

To decrypt the memory, the Fourier transform of the encrypted memory φ (x,y) is multiplied by the decoding mask $\exp[-jb_i(\alpha, \beta)]$. This causes the encoding phase function $\exp[jb_i(\alpha, \beta)]$ to be canceled out by the decoding mask $\exp[-jb_i(\alpha, \beta)]$ that serves as the key for decryption. The decoded image is then inverse Fourier transformed to the space domain. Therefore, the original data image $f_i(x,y)$ can be recovered in the space domain. If the stored image is positive, the phase function $\exp[jn_i(x,y)]$ is removed by an intensity sensitive device, such as a video camera. More specifically, $|f_i(x,y)|^2$ is obtained, when $f_i(x,y)$ has a positive pixel value, knowing $|f_i(x,y)|_2$ is equivalent to knowing $f_i(x,y)$ whereby the original data image is obtained, as is readily apparent to one of ordinary skill in the art. Alternatively, the decoded image in the space domain is multiplied by a complex conjugate of the original mask, i.e., $\exp[-jn_i(x,y)]$, which will provide the original data image $f_i(x,y)$. This alternative is required when $f_i(x,y)$ is not positive or real. It will be appreciated that the images not decrypted remain stationary white background noise. If only one image is to encrypted and stored, then M=1 in the above equation, and an encrypted image is obtained.

Referring to FIG. 1, an example of an optical assembly for use in the encryption technique of the present invention is generally shown at 10. A light source 12 (e.g., an argon-ion laser) generates a generally coherent light beam 14. Light beam 14 passes through a pin hole aperture stop 16 and is collimated by a collimating lens 18. A collimated light beam 20 is directed by a first mirror 22 to a beam splitter 24 where beam 20 is split into an object beam 26 and a reference beam 28 for hologram recording. Object beam passes through a shutter 30 where it is directed by a second mirror 32. Two 4-f structures 34 and 36 are cascaded in this optical assembly to verify the present invention. The first structure 34 performs the encryption and the second structure 36 performs the decryption. It is preferred that the optical paths for the object beam 26 and the reference beam 28 from beam splitter 24 to a plane 48 (also designated $P_3$ in the FIGURE) are adjusted to be generally equal.

In the memory recording process, a data image f(x,y) to be encrypted is placed at an input plane 50 (also designated $P_1$ in the FIGURE) and a random phase mask $M_1$ having a two dimensional function is attached to it. An intensity sensitive detector will not be able to read this phase-encoded pattern. This mask can be sandwiched between two layers of durable transparent optical films which are filled with a liquid to compensate for the phase non-uniformities of the optical materials, that is, a so-called liquid gate. Such methods of making the mask are known and are described in U.S. Pat. Nos. 4,588,260; 4,765,714; and 4,588,260 all to Homer et al, each of which is incorporated herein by reference in its entirety. A variety of other techniques can be used to synthesize the phase mask. The mask can be fabricated by embossing thin materials, which can be multilayered, and are called pure phase material, or photo polymers which are commercially available from, e.g., Polaroid and DuPont. Techniques such as those used to make refractive/binary optical elements can also be employed. It will be appreciated that photo refractive materials can also be used. These techniques can also be combined to make the mask. Shutter 30 is in the open position. A Fourier transform of the product of the image and the random phase function $M_1$ is obtained at a Fourier plane 52 (also designated $P_2$ in the FIGURE $M_1$) by lens 38, i.e., a beam 54. The Fourier transform of this product (beam 54) is multiplied by another random phase mask $M_2$ having a two dimensional function which is placed at plane 52, resulting in a beam 56. Taking another Fourier transform (i.e., an inverse Fourier transform) of beam 56 by lens 40, the encrypted image data (beam 58) is obtained at plane 48. An optical recording media is placed at plane 48, whereby a holographic optical memory is obtained.

It is important to note, that by repeating this process, multiple images can be recorded on the same memory with different random phase masks that are independent from one another. Therefore, a specific data image can be decrypted from the memory by the corresponding key while other data remains encrypted.

To decrypt the image data, the shutter 30 is closed and the optical memory is placed at plane 48. A Fourier transform of the encrypted image is obtained at a plane 60 (also designated $P_4$ in the FIGURE) by lens 42, i.e., a beam 62, where it is multiplied by a phase mask $M_3$ having a two dimensional function that is the complex conjugate of the function of random phase mask $M_2$, resulting in a beam 64. Taking another Fourier transform (i.e., an inverse Fourier transform) of beam 64 by lens 44, the original (decrypted) image data (beam 66) is obtained at an output plane 68 (also designated $P_5$ in the FIGURE) by detector 46, whereby the random phase modulation of mask $M_1$ is removed, as described herein above.

In this example, M3=M2* serves as the key for decryption. It is obtained by producing a mask who's function is the complex conjugate of the $M_2$ mask. It will be appreciated that without this key, the encrypted image can not be recovered. When a multiple-image memory is placed at plane 48, the desired image can be decrypted with the corresponding phase mask $M_3$.

Figure 2:
FIG. 2 shows images of characters "E" and "Q".
Figure 3:
FIG. 3 shows a resulting encrypted holographic memory.
Figure 4:
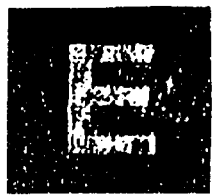
FIG. 4 shows decrypted images of the characters "E" and "Q" of FIG. 2.
Figure 4:
Figure 6A:
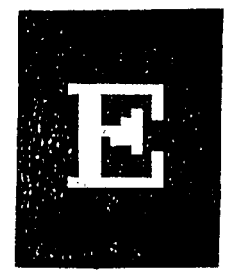
Figure 5:
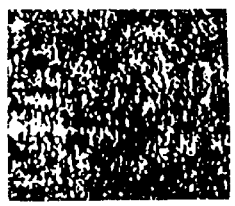
FIG. 5 shows a resulting decryption with a wrong mask.
Figure 6B:
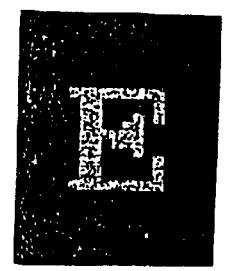
Figure 6C:
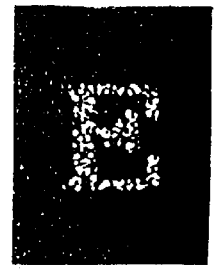
Figure 6D:

In an experiment employing optical assembly 10 of the present invention, images of the characters "E" and "Q" were used as the data images (FIG. 2) and were encrypted sequentially in the same memory using different random phase masks, as described above. Random phase masks $M_{1E}$ and $M_{2E}$ were used to encrypt the image of "E", and random phase masks $M_{1Q}$ and $M_{2Q}$ were used to encrypt the image of "Q". These four masks are independent white sequences, 32×32 pixels (7.2 mm×7.2 mm in size) two dimensional arrays. The phase masks are made by bleaching (see, Optical Holography, by R. J. Collier, B. Burckhardt, and L. H. Lin, Chapter 10, (1971) which is incorporated herein by reference in its entirety) the gray scale photographic films of uniformly distributed white sequences. It will be appreciated that there are a variety of known techniques can be used to store and/or display the encrypted images without departing from the spirit or scope of the present invention, such being readily apparent to one of ordinary skill in the art. If holography is used, a variety of holographic techniques can be used, see, e.g., Optical Holography, by R. J. Collier, B. Burckhardt, and L. H. Lin, Chapter 10, (1971), or a variety of angular, wavelength, or polarization multiplexing techniques can be used to store the encrypted images, such being well known and can be found in many of the references incorporated into this patent. The phase of each pixel is independent of other pixels and approximately distributed uniformly on $[0,2\pi]$. The image of "E" was first encrypted with $M_{1E}$ and $M_{2E}$, then the image of "Q" was encrypted with $M_{1Q}$ and $M_{2Q}$, as described herein above. The encrypted images were recorded on a high speed holographic film (KODAK, SO-253) placed at plane 48 with the reference beam 28. The resulting encrypted holographic memory is shown in FIG. 3. It will be appreciated that the reason that the encrypted memory (FIG. 3) is not quite a white noise is the limited space-bandwidth product of the optical system due to the finite size and the limited number of pixels of the random phase masks used in the Fourier domain. In accordance with which, images can only be encrypted up to certain frequencies, resulting in limited bandwidth encrypted output images. White noise has an infinite bandwidth. The decrypted data images obtained in plane 68 are shown in FIG. 4. These images were obtained by using masks $M_{2E}$ and $M_{3Q}$, respectively, i.e., the masks $M_{3E}$ and $M_{3Q}$ have a two dimensional function that is the complex conjugate of the function of masks $M_{2E}$ and $M_{2Q}$, respectively. It is clear that the images have been recovered, though there is some noise on the recovered images. This noise is again due to the limited space-bandwidth product, discussed above. When a wrong phase mask $M_3$ is used to decrypt the images, only noise is obtained. FIG. 5 shows the result of applying a wrong mask to the optical memory in which the images "E" and "Q" are encrypted.

The quality of the decrypted images can be improved by increasing the space-bandwidth product of the masks' functions. FIGS. 6A–D show a computer simulation for the encrypted memory where the image "E" is stored using 256×256 random phase codes and is recovered with the decrypting phase codes of different sizes.

The above embodiments of the present invention are directed to two dimensional applications, however it is within the scope of the present invention that one dimensional functions be used. More specifically, an image is multiplied by a random phase function, e.g., by attaching a one dimensional phase-only mask to the image. The Fourier transform of the product of the image and the random phase function is then multiplied by another one dimensional random phase function in the Fourier domain. Taking the inverse Fourier transform, a encrypted memory is obtained. The encrypted memory is a stationary white noise if two encrypt random phase functions are two independent white sequences uniformly distribute in $[0;2\pi]$.

By way of example, f(x) denotes the optical memory and $\phi(x)$ the encrypted memory. n(x) and b(v) denote two independent white sequences uniformly distributed in $[0,2\pi]$. The random phase function $\exp[jn(x)]$ is used in the space domain and random phase function $\exp[[jb(v)]$ is used in Fourier domain in the encryption. The encrypted memory can be represented as:

$$\phi(x)=f(x)\exp[jn(x)]*\mu(x).$$

where $\mu(x)$ is the Fourier transform of $\exp[jb(v)]$ and * denotes the convolution operation. $\phi(x)$ is a stationary white random process, see "Optical image encryption based on input plane and Fourier plane random encoding," by Ph. Refregier and B. Javidi, Opt. Lett., 20(7), (1995).

Figure 7:
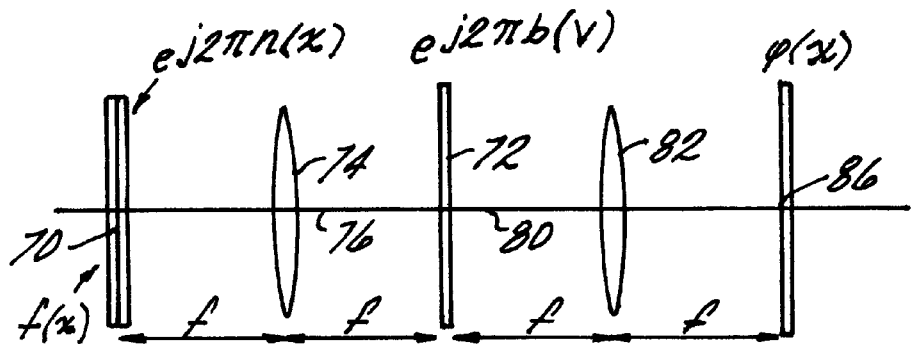
FIG. 7 is a schematic diagram of an optical assembly for use in the encryption technique of the present invention.
Figure 8:
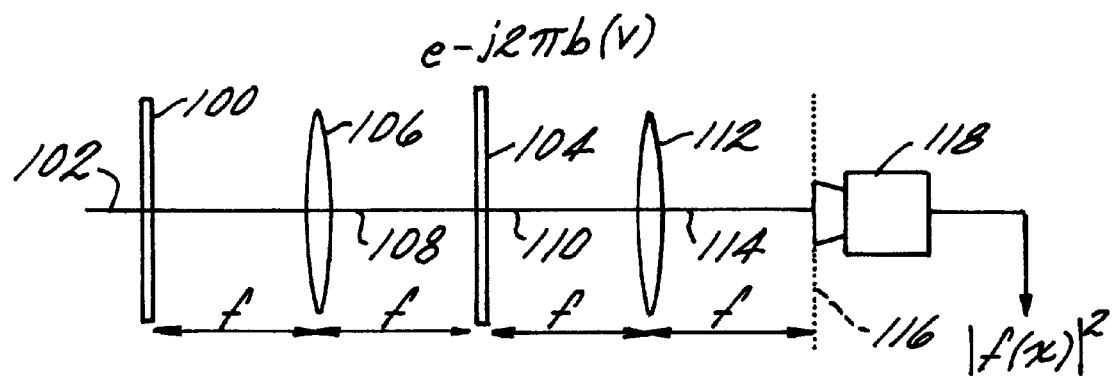
FIG. 8 is a schematic diagram of an optical assembly for use in the decryption technique of the present invention.

Referring to FIGS. 7 and 8, an example of an optical assembly for use in the encryption technique with one dimensional functions is generally shown.

In the memory recording process, the data image f(x) to be encrypted is placed at an input plane 70 and a random phase mask having a one dimensional function, i.e., $\exp[j2\pi n(x)]$, is attached to it. A Fourier transform of the product of the image and the random phase function is obtained at a Fourier plane 72 by a Fourier transform lens 74, i.e., a beam 76. The Fourier transform of this product (beam 76) is multiplied by another random phase mask having a one dimensional function, i.e., $\exp[jb(v)]$, which is placed at plane 72, resulting in a beam 80. Taking another Fourier transform of beam 80 by a Fourier transform lens 82, the encrypted image data $\phi(x)$ is obtained at a plane 86. An optical recording media is placed at plane 86, whereby a holographic optical memory is obtained.

To decrypt the memory $\phi(x)$, a key, which is complex conjugate of the white random sequence for the encryption, is needed. The encrypted memory is placed at an input plane 100, FIG. 8, and is within the path a generally coherent light beam 102. A Fourier transform of the encrypted image $\phi(x)$ is obtained at a plane 104 by a Fourier transform lens 106, i.e., a beam 108, where it is multiplied by a decoding phase mask having a one dimensional function, i.e., $\exp[-jb(v)]$, that is the complex conjugate of the function of random coding phase mask, i.e., $\exp[jb(v)]$, resulting in a beam 110. Taking another Fourier transform of beam 110 by a Fourier transform lens 112, the original (decrypted) image data (beam 114) is obtained at an output plane 116 by detector (e.g., a one dimensional CCD camera or array) 118, whereby the first random phase modulation, i.e., $\exp[jn(x)]$, is removed, as described hereinabove. It will be appreciated that without this key, the encrypted image can not be recovered.

With a plurality of images to be encrypted and stored, e.g., $f_1(x), f_2(x) \ldots, f_m(x)$, M pairs of $n_i(x)$ and $b_i(v)$ (I=1,2, . . . ,M) can be created to encrypt each image by each key $b_i(v)$. In this case, the encrypt memory $\phi(x)$ is $$\varphi(x) = \sum_{i=1}^{M} \{f_i(x)\exp[jn_i(x)]\} * \mu_i(x)$$

where $\mu_i(x)$ is the Fourier transform of $\exp[jb_i(v)]$. With $\phi(x)$ at the input plane 100 of the decrypt system, FIG. 8, $\exp[-jb_k(v)]$ is used as the key. At the Fourier plane 104, the Fourier transform of the output is $$O(v) = F_k(v) * N_k(v) + \sum_{\substack{i=1 \\ i \neq k}}^{M} [F_i(v) * N_i(v)] \exp\{j[b_i(v) - b_k(v)]\}$$

where $N_i(v)$ is the Fourier transform of $n_i(x)$. Since $b_k(V)$ is independent of $b_i(v)$ for all $i \neq k$, each term in the summation in the above equation becomes a stationary white noise at the output of the decrypt system. Only $f_k(x)$ is decrypted from $\phi(x)$.

The un-decrypted terms in the above equation contribute stationary white noises at the output plane as a background noise. This problem can be solved by use of volume holograms with different multiplexing techniques."Volume hologram multiplexing using a deterministic phase encoding technique," by Denz, G. Pauliat, G. Roosen, and T. Tschudi, Opt. Comm. 85, 171, (1991) and "Incremental recording for photo refractive hologram multiplexing," Taketomi, J. E. Ford, H. Sasaki, J. Ma, Y. Fainman, and S. H. Lee, Opt. Lett., 16, 1774, (1991), both of which are incorporated herein by reference in their entirety. So, the stored memory data can be recalled independently. When using random phase encryption in conjunction with multiplexing techniques, only the desired memory data is decrypted at the output by using the correct key.

Using different keys to decrypt different memory data allows the memory to be distributed through public channels. Only the keys are needed to be distributed securely. This allows many users share the same encrypted memory without losing the security.

Further, the encryption process of the present invention can be done optically, as described above, or electronically.

Figure 9:
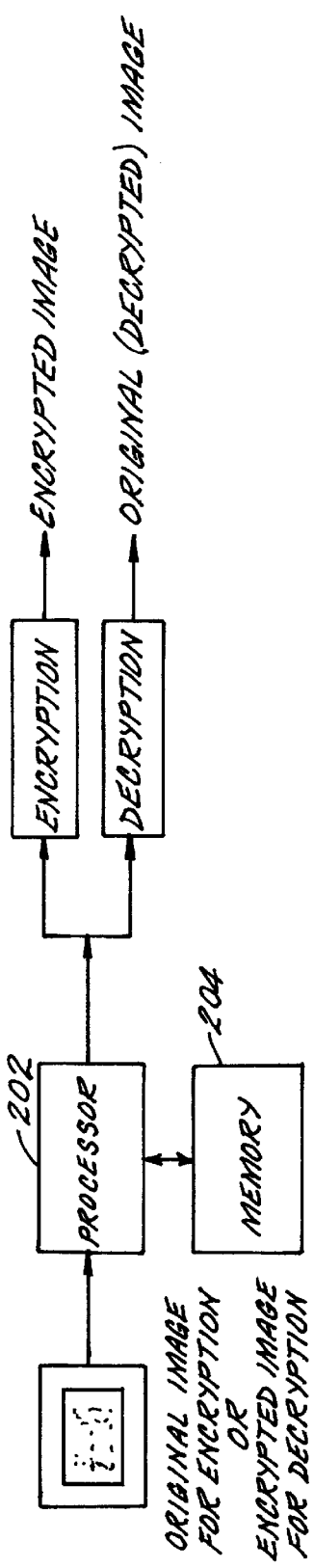
FIG. 9 is a schematic block diagram of an electronic embodiment of the encryption/decryption technique of the present invention.
Figure 10:
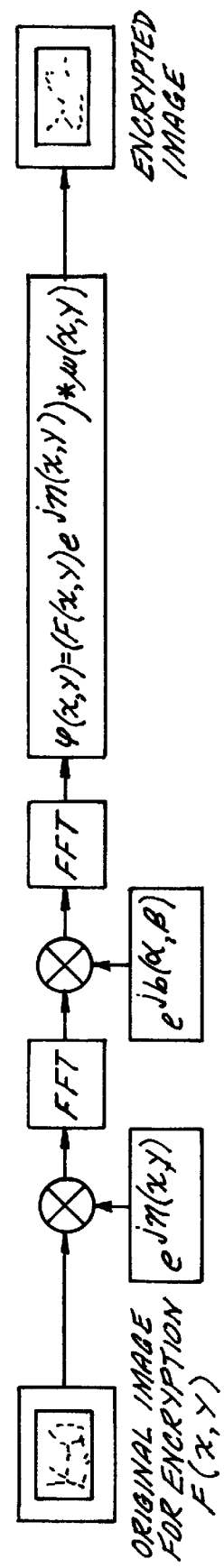
FIG. 10 is a block diagram of the encryption technique of the present invention.
Figure 11:
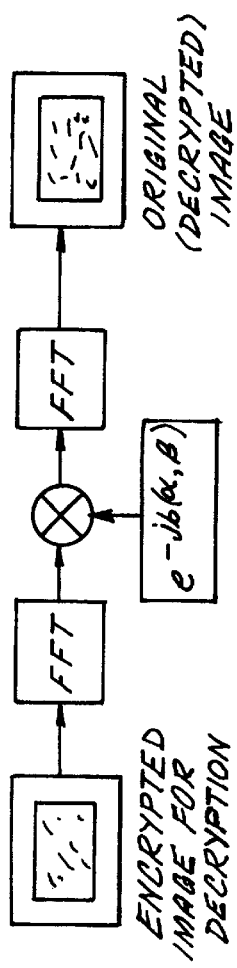
FIG. 11 is a block diagram of the decryption technique of the present invention.

Referring now to FIGS. 9–11, an image f(x,y) to be encrypted is digitized, digitizing of images being well known in the art. The digitized image signals are processed by a processor 202 having memory 204. More specifically, the image is multiplied by a first random function, e.g., exp[jn(x,y)], by processor 202. A Fourier transform of the product of the image and the first random phase function is obtained by the processor 202. This Fourier transform is then multiplied by a second random function, e.g., exp[jb(α, β)], by processor 202. A Fourier transform of this second product is obtained by the processor 202, resulting in an encrypted digitized image signal. A hard copy of this encrypted digitized image signal can be generated, as obtaining hard copies of digitized images is well known in the art. Although not shown in these FIGURES, additional levels of encryption can be added, e.g., the inverse Fourier transformed image (in the space domain) could be encoded with a function exp[jm(x,y)] which could be removed during decryption by the complex conjugate thereof.

To decrypt an encrypted image, the encrypted image is digitized. The encrypted digitized image signals are processed by processor 202. More specifically, a Fourier transform of the encrypted image is obtained. This Fourier transform is multiplied by a third function , i.e., exp[-jb(α, β], which is the complex conjugate of the second function, by the processor 202. Another Fourier transform is taken from which the original (decrypted) digitized image f(x,y) is obtained by the processor 202, as described hereinabove. A hard copy of this encrypted digitized image signal can be generated, as discussed above.

Figure 12:
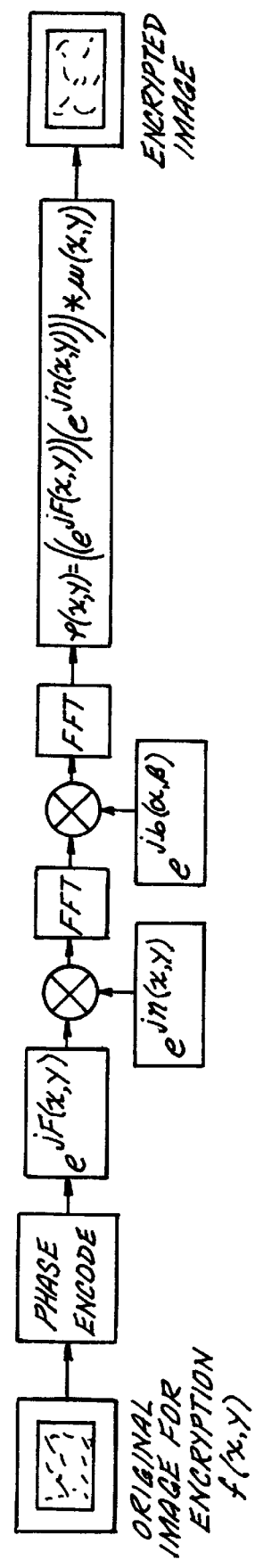
FIG. 12 is a block diagram of the encryption technique in accordance with an alternate embodiment of the present invention.
Figure 13:
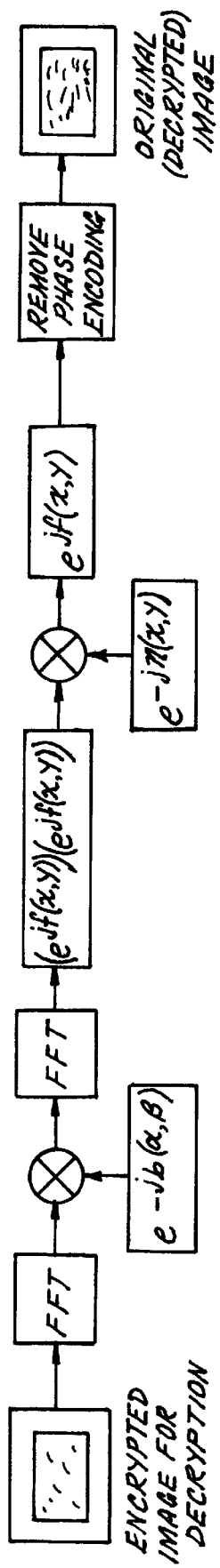
FIG. 13 is a block diagram of the decryption technique in accordance with an alternate embodiment of the present invention.

Alternatively, referring to FIGS. 12 and 13, the image f(x,y) is phase encoded (optically or digitally) prior to the encryption process, e.g., exp[jf(x,y)]. This phase encoded image is then multiplied by a first random function, e.g., exp[jn(x,y)], by processor 202. A Fourier transform of the product of the image and the first random phase function is obtained by the processor 202. This Fourier transform is then multiplied by a second random function, e.g., exp[jb(α, β)], by processor 202. A Fourier transform of this second product is obtained by the processor 202, resulting in an encrypted digitized image signal. A hard copy of this encrypted digitized image signal can be generated, as obtaining hard copies of digitized images is well known in the art. This alternate method of encryption provides an added level of security.

To decrypt an encrypted image, the encrypted image is digitized. The encrypted digitized image signals are processed by processor 202. More specifically, a Fourier transform of the encrypted image is obtained. This Fourier transform is multiplied by a third function, i.e., exp[-jb(α, β)], which is the complex conjugate of the second function, by the processor 202. Another Fourier transform is taken to obtain ((exp[jf(x,y)]) (exp[jn(x,y)])) which is multiplied by a fourth function, i.e., exp[-jn(x,y)], which is the complex conjugate of the first function, resulting in the original phase encode digitized image exp[jf(x,y)]. The original decrypted image f(x,y) is readily obtained using any well known phase reading techniques, examples of such being found in many of the references incorporated herein. A hard copy of this encrypted digitized image signal can be generated, as discussed above.

Again, while this example is illustrated electronically such can easily be accomplished optically as is readily apparent to one of ordinary skill in the art. Further, while a two-dimensional example is provide such is also applicable to one-dimension, e.g., y=0.

In accordance with an alternate embodiment of the present invention, an original image f(x,y) is convolved with a function $\mu$(x,y) (which is the Fourier transform of exp[jb (α, β)]). Alternatively, the original image can be phase encode, e.g., exp[jf(x,y)], and then convolved with $\mu$(x,y). It will be appreciated that such can readily be applied to one dimension by one of ordinary skill in the art.

Figure 14:
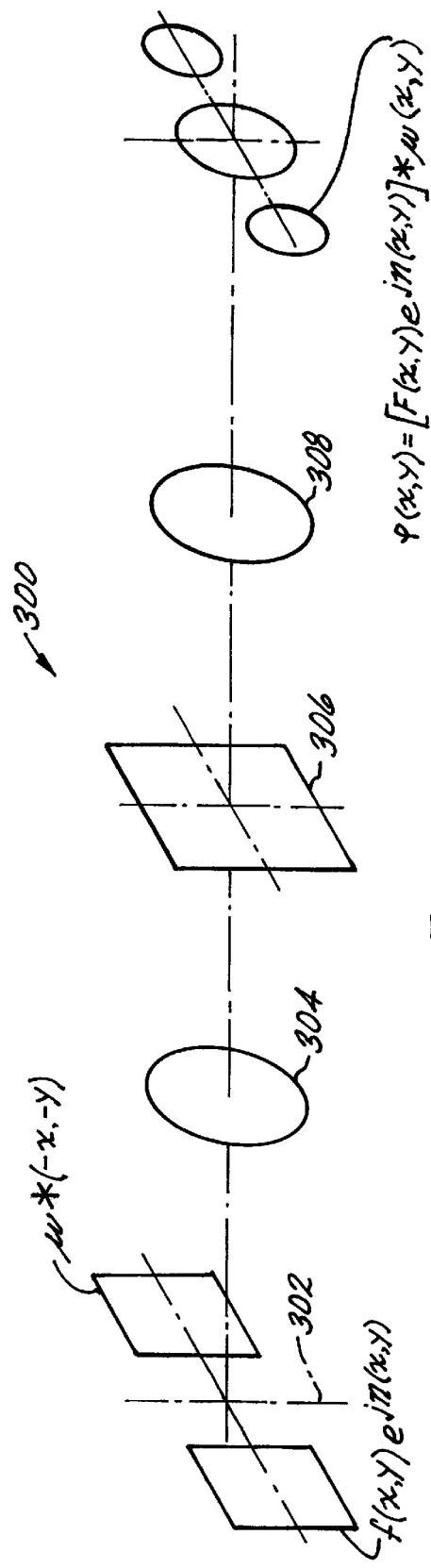
FIG. 14 is a block diagram of the encryption technique in accordance with still another alternate embodiment of the present invention.
Figure 15:
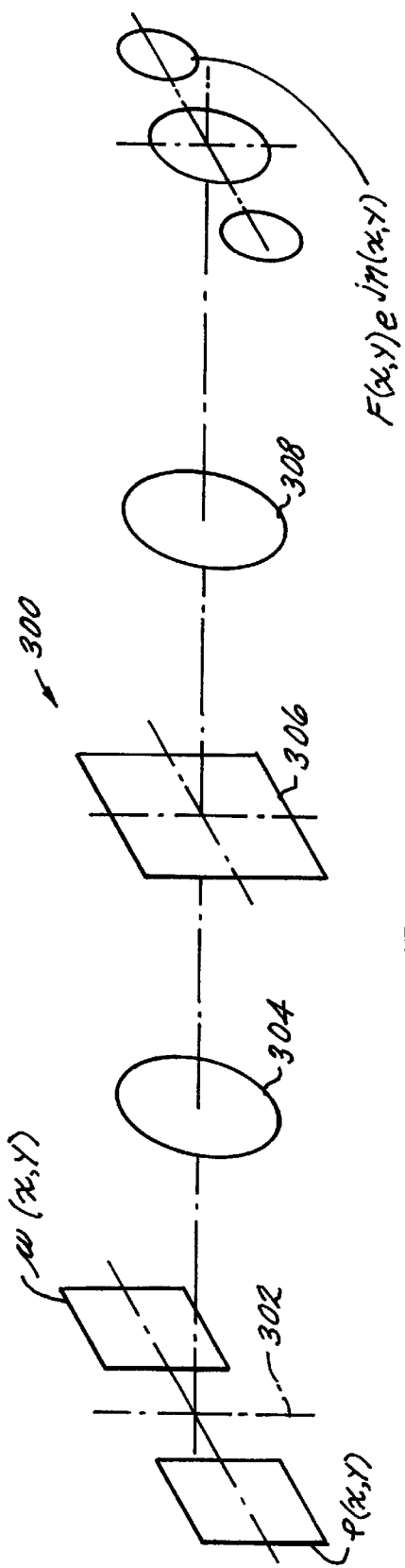
FIG. 15 is a block diagram of the decryption technique in accordance with still another alternate embodiment of the present invention.

Referring to FIGS. 14 and 15, a joint transform correlator (JTC) 300 (see, Real Time Optical Information Processing, by B. Javidi and J. L. Homer, Academic Press (1994) which is incorporated herein by reference in its entirety and Fundamentals of Photonics, by B. E. A. Salchand and M. Teich, Wiley (1990) ) is employed in the encryption process of the present invention. The use of a JTC provides for ease in implementation optically, is robust in terms of system alignment and is relatively inexpensive. An original image f(x,y) to be encrypted is multiplied by a first random function exp[jn(x,y)] resulting in a product image f(x)exp[jn(x,y)], as described hereinbefore. The product image f(x)exp[jn(x,y)] and a function $\mu$*(-x,-y) ($\mu$*(-x,-y) is the Fourier transform of exp[-jb(α, β)] are displayed side by side on a spatial light modulator 302 (e.g., a liquid crystal television) at the input plane of the JTC. These patterns are jointly Fourier transformed by a first Fourier transform lens 304. The interference intensity or joint power spectrum is recorded by an intensity device 306 (e.g., a photo polymer, a photo refractive material, a spatial light modulator, a liquid crystal light valve, a CCD array or other smart pixel device) located at the back focal plane of lens 304. The joint power spectrum is Fourier transformed by a second Fourier transform lens 308 to obtain an encrypted image at the output plane of the JTC. The encrypted memory can be represented as:

$$\phi(x,y) = \{f(x,y) \exp[jn(x,y)]\} * \mu(x,y)$$

where $\mu$(x,y) is the inverse Fourier transform of exp[jb (α, β)], and * denotes the convolution operation. An optical recording media is placed at the output plane of the JTC, whereby a holographic optical memory is obtained. It will be appreciated that the JTC architecture can be implemented using a photo refractive medium in the Fourier plane to generate the joint power spectrum and perform the correlation/convolution.

To decrypt the encrypted image with the JTC, the encrypted image $\phi(x,y)$ and the function $\mu(x,y)$ are displayed side by side on a spatial light modulator 302 at the input plane of the JTC. These patterns are jointly Fourier transformed by Fourier transform lens 304. The interference intensity or joint power spectrum is recorded by intensity device 306 located at the back focal plane of lens 304. The joint power spectrum is Fourier transformed by Fourier transform lens 308 resulting in the product image $f(x)\exp[jn(x,y)]$ at the output plane of the JTC. The original decrypted image $f(x,y)$ is readily obtained by any of the methods described hereinbefore.

The JTC embodiment of the present invention, described above, can be further combined with phase encoding in the input plane or random encoding in the Fourier plane, as described hereinbefore. Further, combinations of the various techniques described herein may be employed and are within the scope of the present invention. By way of example: (1) an image may be optically encrypted and a JTC or a filter based system used for decryption; (2) an image may be digitally encrypted and a JTC or a filter based system used for decryption; or (3) an image may be optically encrypted with a filter based system and a JTC or a filter based system used for decryption. The foregoing examples are only exemplary, whereby other combinations of the encryption/decryption techniques of the present invention may be employed, as such will be readily apparent to one of ordinary skill in the art.

Figure 16:
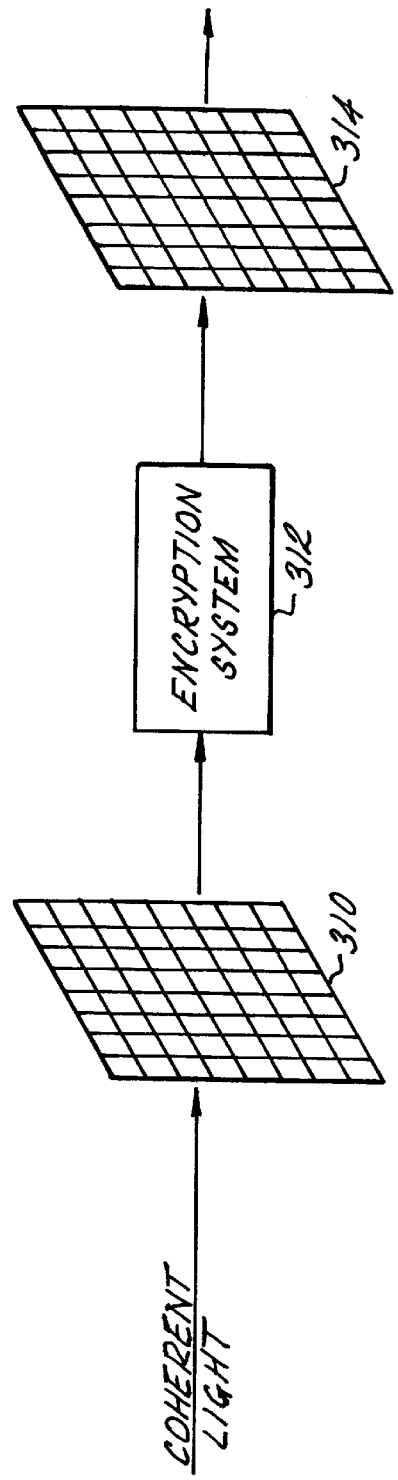
FIG. 16 is a block diagram of the encryption system of the present invention used for high speed parallel encryption of data communication.

Referring to FIG. 16, an example of using the encryption system of the present invention for high speed parallel encryption for data communication is shown. Input data to be encrypted is displayed on an optical device, e.g., a spatial light modulator, a CCD array or other smart pixel device, at plane 310. The resulting image is encrypted by an encryption system 312, such as described hereinbefore, to generate encrypted data for transmission at plane 314.

While many of the above described embodiments provide examples of encryption of a specific type of information, it is within the scope of the present invention that such information includes optical images, digitized images, one-dimensional data, two-dimensional data, electrical signals or optical signals. Further, while several of the above described embodiments provide examples of encryption of a single image, it is within the scope of the present invention that each of the systems described herein is equally applicable to a plurality of images.

While this example is illustrated optically such can easily be accomplished electronically as is readily apparent to one of ordinary skill in the art. Further, while a two-dimensional example is provide such is also applicable to one-dimension, e.g., y=0.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of encryption and decryption comprising the steps of:

encrypting original information, comprising the step of, (1) multiplying said original information by a first key to generate a first product of said original information and said first key in a first domain, (2) transforming said first product from said first domain into a second domain to generate a first transformed product in said second domain, (3) multiplying said first transformed product by a second key in said second domain to generate a second product, (4) transforming said second product from said second domain to said first domain to generate an encrypted information; and decrypting said encrypted information, comprising the steps of, (1) transforming said encrypted information from said first domain to said second domain to generate a transformed encrypted information, (2) multiplying said transformed encrypted information by a third key in said second domain to generate a third product, said third key being a conjugate of said second key wherein said second key is removed from said encrypted information, (3) transforming said third product from said second domain to said first domain to generate a second transformed product in said first domain, and (4) removing said first key from said second transformed product to provided decrypted information indicative of said original information.

2. The method of claim 1 wherein said information comprises an optical image, a digitized image, one-dimensional data, two-dimensional data, an electrical signal or an optical signal.

3. The method of claim 1 further comprising the steps of:

phase encoding said original information prior to said step (1) of said step of encrypting; and removing said phase encoding from said encrypted information to provided said decrypted information.

4. The method of claim 1 wherein said step of removing comprises:

multiplying said second transformed product by a fourth key in said first domain to generate said decrypted information, said fourth key being a conjugate of said first key wherein said first key is removed from said encrypted information.

5. The method of claim 1 wherein said step of removing comprises:

removing said first key with an intensity sensitive device.

6. The method of claim 1 wherein said steps of transforming comprise Fourier transforming.

7. The method of claim 1 wherein said first and second keys comprise random phase functions.

8. The method of claim 1 wherein said first and second keys comprise complex amplitude and phase functions.

9. The method of claim 7 wherein said random phase functions comprise generally uniformly distributed white sequences.

10. The method of claim 1 wherein said first and second keys comprise one dimensional functions.

11. The method of claim 1 wherein said first and second keys comprise two dimensional functions.

12. The method of claim 1 wherein said first domain is a space domain and said second domain is a Fourier domain.

13. The method of claim 2 wherein said optical image, digitized image, one-dimensional data, two-dimensional data, electrical signal or optical signal comprises a plurality thereof.

14. The method of claim 12 wherein:

said first key comprises a function expressed as exp(jn(x, y)), where n(x,y) comprises a white sequence uniformly distributed on (0, 2π) and x and y are coordinates of said space domain;

said second key comprises a function expressed as exp (jb(α, β)), where b(α, β) comprises a white sequence uniformly distributed on (0, 2π) and α and β are the coordinates of said Fourier domain;

said encrypted information has a function expressed as $$\phi(x,y)=(f(x,y) \exp (jn(x,y)))*\mu(x,y)$$

where $\mu(x,y)$ is an inverse Fourier transform of exp(jb (α, β)) and * denotes a convolution operation; and said third key comprises a function expressed as exp(−jb (α, β)) which is a complex conjugate of said second key.

15. The method of claim 12 wherein:

said first key comprises a function expressed as exp(jn (x)), where n(x) comprises a white sequence uniformly distributed on (0, 2π) and x is a coordinate of said space domain;

said second key comprises a function expressed as exp (jb(v)), where comprises a white sequence uniformly distributed on (0, 2π) and v is a coordinate of said Fourier domain;

said encrypted information has a function expressed as $$\phi(x)=(f(x) \exp (jn(x)))*\mu(x)$$

where $\mu(x)$ is an inverse Fourier transform of exp(jb(v)) and * denotes a convolution operation; and said third key comprises a function expressed as exp(−jb (v)) which is a complex conjugate of said second key.

16. A method of encrypting original information comprising the steps of:

multiplying said original information by a first key to generate a first product of said original information and said first key in a first domain;

transforming said first product from said first domain into a second domain to generate a transformed product in said second domain;

multiplying said transformed product by a second key in said second domain to generate a second product; and transforming said second product from said second domain to said first domain to generate encrypted information.

17. The method of claim 16 wherein said information comprises an optical image, a digitized image, one-dimensional data, two-dimensional data, an electrical signal or an optical signal.

18. The method of claim 16 further comprising the step of:

phase encoding said original information prior to said first step of multiplying.

19. The method of claim 16 wherein said steps of transforming comprises Fourier transforming.

20. The method of claim 16 wherein said first and second keys comprise random phase functions.

21. The method of claim 16 wherein said first and second keys comprise complex amplitude and phase functions.

22. The method of claim 19 wherein said random phase functions comprise generally uniformly distributed white sequences.

23. The method of claim 16 wherein said first and second keys comprise one dimensional functions.

24. The method of claim 16 wherein said first and second keys comprise two dimensional functions.

25. The method of claim 16 wherein said first domain is a space domain and said second domain is a Fourier domain.

26. The method of claim 25 wherein:

said first key comprises a function expressed as exp(jn(x, y)), where n(x,y) comprises a white sequence uniformly distributed on (0, 2π) and x and y are coordinates of said space domain;

said second key comprises a function expressed as exp (jb(α, β)), where comprises a white sequence uniformly distributed on (0, 2π) and α and β are the coordinates of said Fourier domain; and said encrypted information has a function expressed as $$\phi(x,y)=(f(x,y) \exp (jn(x,y)))* \mu(x,y)$$

where $\mu(x,y)$ is an inverse Fourier transform of exp(jb(α, β)) and * denotes a convolution operation.

27. The method of claim 25 wherein:

said first key comprises a function expressed as exp(jn (x)), where n(x) comprises a white sequence uniformly distributed on (0, 2π) and x is a coordinate of said space domain;

said second key comprises a function expressed as exp (jb(v)), where comprises a white sequence uniformly distributed on (0, 2π) and v is a coordinate of said Fourier domain; and said encrypted information has a function expressed as $$\phi(x)=(f(x) \exp (jn(x)))*\mu(x)$$

where $\mu(x)$ is an inverse Fourier transform of exp(jb(v)) and * denotes a convolution operation.

28. The method of claim 17 wherein said optical image, digitized image, one-dimensional data, two-dimensional data, electrical signal or optical signal comprises a plurality thereof.

29. A method of decrypting encrypted information comprising the steps of:

transforming said encrypted information from a first domain to a second domain to generate first transformed encrypted information;

multiplying said first transformed encrypted information by a first key in said second domain to generate a first product, said first key being a conjugate of a second key used to generate said encrypted information, wherein said second key is removed from said encrypted information;

transforming said first product from said second domain to said first domain to generate a second transformed product in said first domain; and removing a third key used to generate said encrypted information from said second transformed product to provide decrypted information indicative of original information.

30. The method of claim 29 wherein said information comprises an optical image, a digitized image, one-dimensional data, two-dimensional data, an electrical signal or an optical signal.

31. The method of claim 29 wherein said step of removing comprises:

multiplying said second transformed product by a fourth key in said first domain to generate said decrypted information, said fourth key being a conjugate of said first key wherein said first key is removed from said encrypted information.

32. The method of claim 29 wherein said step of removing comprises:

removing said first key with an intensity sensitive device.

33. The method of claim 29 wherein said steps of transforming comprises Fourier transforming.

34. The method of claim 29 wherein said second and third keys comprise random phase functions.

35. The method of claim 34 wherein said random phase functions comprise generally uniformly distributed white sequences.

36. The method of claim 29 wherein said second and third keys comprise one dimensional functions.

37. The method of claim 29 wherein said second and third keys comprise two dimensional functions.

38. The method of claim 29 wherein said first domain is a space domain and said second domain is a Fourier domain.

39. The method of claim 30 wherein said optical image, digitized image, one-dimensional data, two-dimensional data, electrical signal or optical signal comprises a plurality thereof.

40. The method of claim 38 wherein:

said second key comprises a function expressed as exp(jb($\alpha$, $\beta$), where comprises a white sequence uniformly distributed on (0, $2\pi$) and $\alpha$ and $\beta$ are the coordinates of said Fourier domain;

said third key comprises a function expressed as exp(jn(x,y)), where n(x,y) comprises a white sequence uniformly distributed on (0, $2\pi$) and x and y are coordinates of said space domain;

said encrypted information has a function expressed as $$\phi(x,y)=(f(x,y) \exp (jn(x,y)))*\mu(x,y)$$

where $\mu(x,y)$ is an inverse Fourier transform of exp(jb($\alpha$, $\beta$)) and * denotes a convolution operation; and said first key comprises a function expressed as exp(−jb ($\alpha$, $\beta$)) which is a complex conjugate of said second key.

41. The method of claim 38 wherein:

said second key comprises a function expressed as exp(jb(v)), where comprises a white sequence uniformly distributed on (0, $2\pi$) and v is a coordinate of said Fourier domain;

said third key comprises a function expressed as exp(jn(x)), where n(x) comprises a white sequence uniformly distributed on (0, $2\pi$) and x is a coordinate of said space domain;

said encrypted information has a function expressed as $$\phi(x)=(f(x) \exp (jn(x)))*\mu(x)$$

where $\mu(x)$ is an inverse Fourier transform of exp(jb(v)) and * denotes a convolution operation; and said first key comprises a function expressed as exp(−jb (v)) which is a complex conjugate of said second key.

42. A method of encryption and decryption comprising the steps of:

encrypting original information, comprising the step of,
  (1) transforming said original information from said first domain into a second domain to generate a transformed original information in said second domain,
  (2) multiplying said transformed original information by a first key in said second domain to generate a first product,
  (3) transforming said first product from said second domain to said first domain to generate an encrypted information; and decrypting said encrypted information, comprising the steps of,
  (1) transforming said encrypted information from said first domain to said second domain to generate a transformed encrypted information,
  (2) multiplying said transformed encrypted information by a second key in said second domain to generate a second product, said second key being a conjugate of said first key wherein said first key is removed from said encrypted information, and
  (3) transforming said second product from said second domain to said first domain to provided decrypted information indicative of said original information.

43. The method of claim 42 wherein said information comprises an optical image, a digitized image, one-dimensional data, two-dimensional data, an electrical signal or an optical signal.

44. The method of claim 42 further comprising the steps of:

phase encoding said original information prior to said step (1), of said step of encrypting; and removing said phase encoding from said encrypted information to provided said decrypted information.

45. The method of claim 42 wherein said steps of transforming comprise Fourier transforming.

46. The method of claim 42 wherein said first key comprises a random phase function.

47. The method of claim 42 wherein said first key comprises a complex amplitude and phase function.

48. The method of claim 46 wherein said random phase function comprise a generally uniformly distributed white sequence.

49. The method of claim 42 wherein said first key comprises a one dimensional function.

50. The method of claim 42 wherein said first key comprises a two dimensional function.

51. The method of claim 42 wherein said first domain is a space domain and said second domain is a Fourier domain.

52. The method of claim 51 wherein:

said first key comprises a function expressed as exp(jb($\alpha$, $\beta$)), where b($\alpha$, $\beta$) comprises a white sequence uniformly distributed on (0, $2\pi$) and $\alpha$ and $\beta$ are the coordinates of said Fourier domain;

said encrypted information has a function expressed as $$\phi(x,y)=f(x,y)*\mu(x,y)$$

where $\mu(x,y)$ is an inverse Fourier transform of exp(jb($\alpha$, $\beta$)) and * denotes a convolution operation; and said second key comprises a function expressed as exp(−jb($\alpha$, $\beta$)) which is a complex conjugate of said first key.

53. The method of claim 51 wherein:

said first key comprises a function expressed as exp(jb (v)), where comprises a white sequence uniformly distributed on (0, $2\pi$) and v is a coordinate of said Fourier domain;

said encrypted information has a function expressed as $$\phi(x)=f(x)*\mu(x)$$

where $\mu(x)$ is an inverse Fourier transform of exp(jb(v)) and * denotes a convolution operation; and said second key comprises a function expressed as exp(−jb(v)) which is a complex conjugate of said first key.

54. The method of claim 43 wherein said optical image, digitized image, one-dimensional data, two-dimensional data, electrical signal or optical signal comprises a plurality thereof.

55. A method of encryption and decryption comprising the steps of:

encrypting original information, comprising the step of,
(1) jointly transforming said original information and a first key to generate a first joint power spectrum thereof,
(2) transforming said first joint power spectrum to generate an encrypted information which is indicative of a correlation between said original information and said first key; and decrypting said encrypted information, comprising the steps of,
(1) jointly transforming said encrypted information and a second key to generate a second joint power spectrum, said second function being a conjugate of said first key,
(2) transforming said second joint power spectrum to provided decrypted information indicative of said original information and indicative of a correlation between said encrypted information and said second key.

56. The method of claim 55 wherein said information comprises an optical image, a digitized image, one-dimensional data, two-dimensional data, an electrical signal or an optical signal.

57. The method of claim 55 further comprising the steps of:

multiplying said original information by a third key, prior to said step (1) of said step of encrypting; and removing said third key from said encrypted information to provide said decrypted information.

58. The method of claim 55 further comprising the steps of:

phase encoding said original information prior to said step (1) of said step of encrypting; and removing said phase encoding from said encrypted information to provided said decrypted information.

removing said first function with an intensity sensitive device.

59. The method of claim 55 wherein said steps of transforming comprise Fourier transforming.

60. The method of claim 55 wherein:

said first key comprises a function expressed as $\exp(jb(\alpha, \beta))$, where $b(\alpha, \beta)$ comprises a white sequence uniformly distributed on $(0, 2\pi)$ and $\alpha$ and $\beta$ are the coordinates of a Fourier domain;

said encrypted information has a function expressed as $$\mu(x,y) = (f(x,y) \exp(jn(x,y))) * \mu(x,y)$$

where $\mu(x,y)$ is an inverse Fourier transform of $\exp(jb(\alpha, \beta))$ and * denotes a convolution operation; and said second key comprises a function expressed as $\exp(-jb(\alpha, \beta))$ which is a complex conjugate of said first key.

61. The method of claim 55 wherein:

said first key comprises a function expressed as $\exp(jb(v))$, where comprises a white sequence uniformly distributed on $(0, 2\pi)$ and v is a coordinate of a Fourier domain;

said encrypted information has a function expressed as $$\phi(x) = (f(x) \exp(jn(x))) * \mu(x)$$

where $\mu(x)$ is an inverse Fourier transform of $\exp(jb(v))$ and * denotes a convolution operation; and said second key comprises a function expressed as $\exp(-jb(v))$ which is a complex conjugate of said first key.

62. The method of claim 56 wherein said optical image, digitized image, one-dimensional data, two-dimensional data, electrical signal or optical signal comprises a plurality thereof.

* * * * *